Oct. 31, 1961   C. VAN DER LELY ET AL   3,006,134
RAKING DEVICE

Original Filed Oct. 15, 1953   2 Sheets-Sheet 2

INVENTOR.
Cornelis van der Lely
and Ary van der Lely
BY Mason & Mason
Attys.

United States Patent Office 3,006,134
Patented Oct. 31, 1961

3,006,134
RAKING DEVICE
Cornelis van der Lely and Ary van der Lely, Maasland, Netherlands, assignors to C. van der Lely N.V., Maasland, South Holland, Netherlands, a Dutch limited company
Original application Oct. 15, 1953, Ser. No. 386,278. Divided and this application Nov. 19, 1958, Ser. No. 774,870
2 Claims. (Cl. 56—377)

This invention relates to a raking device, such as a side delivery rake swath turner, teddering device or the like, and more specifically to the type having a mobile frame with one or more rotatable raking members, the raking members being rake wheels, drums, or similar means having a plurality of circumferential teeth or similar elements to engage rakable substance. The raking members of such raking device are arranged at an angle to the direction of travel of the mobile frame and are rotated by contact with the ground or rakable substance thereon.

Known raking devices of this kind are designed to adapt themselves to uneven terrain by the provision of mounting means, borne by the frame, individually mounting the raking members and providing floating movement in each of the members' respective planes responding to depressions and elevations in the traversed terrain. However, such mountings complicate and add to the cost of the rake.

The predominate object of this invention is to provide a raking device with the individual raking members mounted on axles which are rigidly secured to the mobile frame. The adaptation of this device to uneven terrain is obtained by special construction of the raking members, thus eliminating the need for individual floating mountings for each raking member.

Other objects, features, and details of the present invention will appear from the following description with reference to the accompanying drawings, in which an embodiment of the invention is shown by way of example.

This application is a division of the application Serial No. 386,278, filed October 15, 1953, now abandoned.

Figure 1:
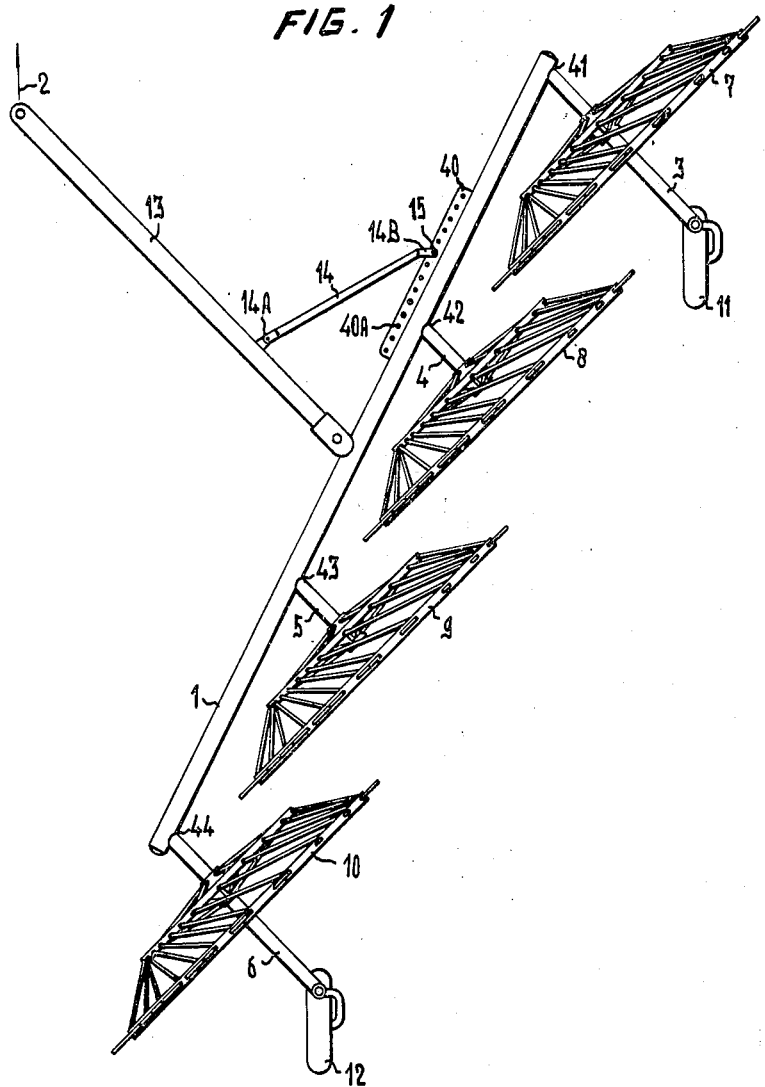
FIGURE 1 is a top plan view of a side delivery rake having four overlapping raking members mounted upon fixed axles.

Referring to FIGURE 1 of the drawings, the side delivery rake shown comprises a frame in the shape of a longitudinal beam 1 extending obliquely with regard to its normal direction of travel, as indicated by arrow 2. On the beam 1, four projections which, by way of example, are parallel axles 3, 4, 5, and 6 rigidly secured at 41, 42, 43, and 44. The axles 3, 4, 5, and 6 extend substantially horizontally and each carries a rotatable raking member 7, 8, 9, and 10, respectively. Axle 3 carries a running wheel 11 and axle 6 carries a running wheel 12. Said wheels, 11 and 12, support the frame and maintain it at a predetermined height above the ground. The wheels 11 and 12 are preferably self-adjusting or swivel wheels which may be locked in position, it being understood that suitable means for locking the wheel in position may be employed.

To the beam 1 is hingedly connected an adjustable draw arm 13 which may be pivoted in a substantially horizontal plane and may be locked in its operative position by means of bar 14 hingedly connected to the arm 13 at point 14A and having at its free extremity an aperture 14B which may be put above one of the corresponding apertures 40A of the member 40 secured to the beam 1. Through the corresponding apertures 40A and 14B there is inserted a locking pin 15.

Figure 2:
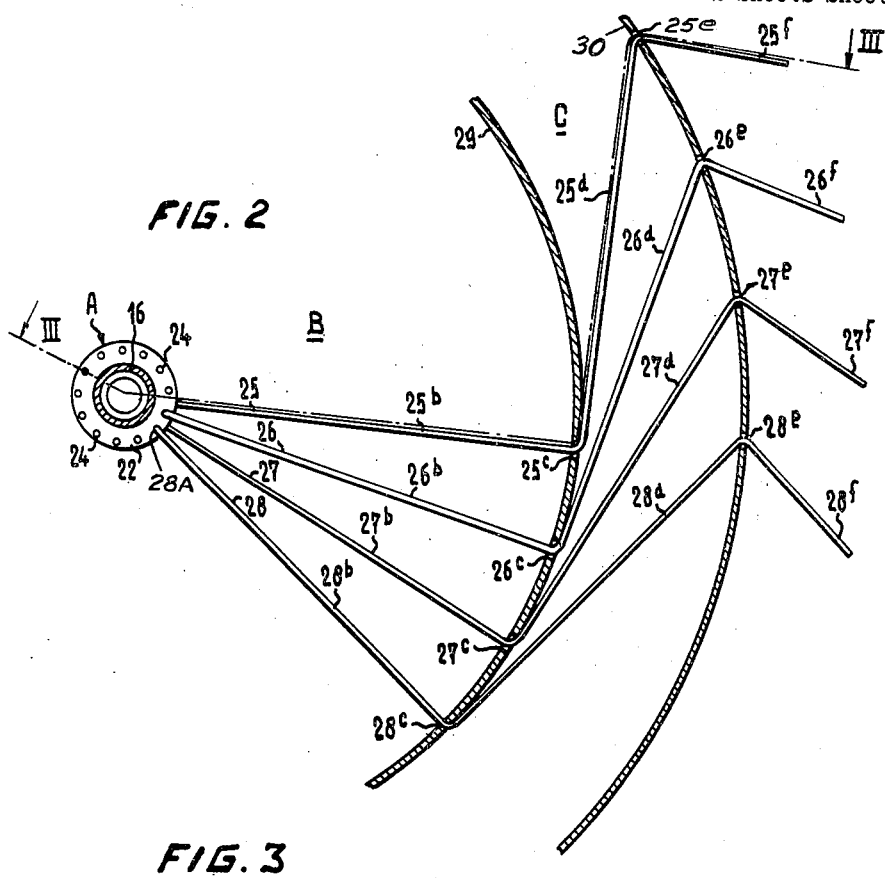
FIGURE 2 is a vertical sectional view of a portion of a raking member through section line II—II of FIGURE 3.

Each of the raking members 7, 8, 9, or 10 comprises a hub A, a substantially rigid part B and a flexible circumferential part C (see FIGURE 2). The hub A comprises a bushing 16 provided with linings and constituting a bearing for the axle carrying the raking member. Said bushing 16 carries at one end a fixed collar 17 and a screw thread 18 at the other end. A collar 20, of the same shape as collar 17, is screwed upon the screw thread 18 in order to lock the bushing 19, after which the collar 20 is secured against rotation.

The outer bushing 19 carries a collar at each of its ends. Each of said collars 21 and 22 is provided with a series of openings 23 and 24, respectively, of which the center lines are parallel to the center line of the hub.

In the embodiment shown, the rigid central portion B and the intermediate flexible circumferential portion C are constituted by a set of spokes 25, 26, 27, and 28, which have been bent at their outer ends to form the catching means or raking elements extending beyond the portion C.

In FIGURE 2, only four spokes 25, 26, 27, and 28 have been shown. The spoke 25 comprises a hook-shaped inboard extremity 25a introduced into one of the openings 23 of the collar 21, a part 25b extending towards an inner rim 29, a part 25d located between the inner rim 29 and an outer rim 30, and a catching means comprising raking tooth or raking element 25f. Where part 25b joins part 25d, the spoke passes through a hole 25c in the inner rim 29. At the foot of the raking tooth 25f, the spoke passes through hole 25e in the outer rim 30. The raking tooth 25f is substantially at right angles to the spoke part 25d, said spoke part 25d being in FIGURE 2 nearly tangent to the inner rim 29. Parts of spokes 26, 27, and 28 are designated in FIGURE 2 in a similar manner to those of the spoke 25.

Figure 3:
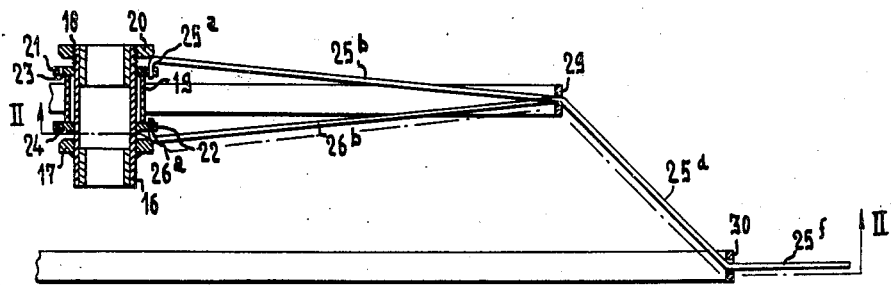
FIGURE 3 is a horizontal section of the raking member through section line III—III in FIGURE 2.

As appears from FIGURE 3, spoke parts 25d, 26d, 27d and 28d, constituting the circumferential portion C of the raking member, are located on a conical surface with the center line of hub A as an axis. Spoke parts 25b, 26b, 27b, and 28b, constituting the central portion B of the raking member, are alternately connected to the collar 21 and to the collar 22 of the hub A. Thus the spokes 25 and 27 run toward the collar 21 whereas spokes 26 and 28 run towards the collar 22. Consequently spoke end 25a and the end of spoke 27 (not shown) are introduced into openings 23 whereas spoke ends 26a and 28a are introduced into openings 24. Due to the spreaded arrangement of the spoke ends thereby obtained, the central portion B of the raking member presents a great rigidity and a great resistance against lateral deflection. The circumferential portion C is, however, adapted to deflect readily out of its conical plane. Upon lateral deflection of the outer rim 30, the spoke parts 25d, 26d, 27d and 28d will turn about spoke parts 25b, 26b, 27b, and 28b, respectively, the latter spoke parts being twisted. Since, in the same manner, the raking teeth 25f, 26f, 27f, and 28f are also able to deflect laterally, and spoke parts 25d, 26d, 27d, and 28d will be twisted, the raking teeth will always be maintained in a favorable raking position independent of lateral deflections of the circumferential portion C.

It has been found in practice that, due to the easily deformable portion C of the raking member and the special construction of the teeth, the raking member adapts itself perfectly to uneven terrain in spite of the fact that the raking member is mounted on a fixed axle.

The above description and drawings disclose a single embodiment of the invention, and specific language has been employed in describing the figures. It will, nevertheless, be understood that no limitations of the scope of the invention are thereby contemplated, and that various alterations and modifications may be made as would occur to one skilled in the art to which the invention relates.

We claim:

1. A device for laterally displacing hay, grass, or other material lying on the ground comprising a mobile frame, overlapping rotatable rake wheels arranged in an echelon along said frame, draw means connected to said frame, at least one supporting wheel interconnected to said frame, axles for mounting said rake wheels, each of said axles being rigidly secured to said frame and extending in a substantially horizontal direction therefrom with at least one rake wheel rotatably mounted on each said axle, each of said rake wheels consisting of an axle supportable hub, a substantially rigid center portion extending outwardly from said hub and concentric therewith, a plurality of resilient rods extending outwardly from said center portion, the inboard portion of each of said resilient rods comprising a supporting member for an outboard portion comprising a raking tooth, said raking tooth extending outwardly at an angle from said supporting member.

2. A device according to claim 1 wherein a rim member having radial holes therethrough is mounted on each of said rake wheels, having each of said resilient rods extending through said holes in said rim member substantially where said raking tooth meets said supporting member.

References Cited in the file of this patent
UNITED STATES PATENTS

| | | |
|---|---|---|
| 720,098 | Bamford | Feb. 10, 1903 |
| 2,851,846 | Van der Lely | Sept. 16, 1958 |

OTHER REFERENCES

Information Circular #4, North Carolina State College, page 7, May 1951.